May 20, 1941.  P. FOURMARIER, JR., ET AL  2,243,004
ELECTRIC ARRANGEMENT FOR TRANSMITTING ANGLES
Filed July 31, 1939
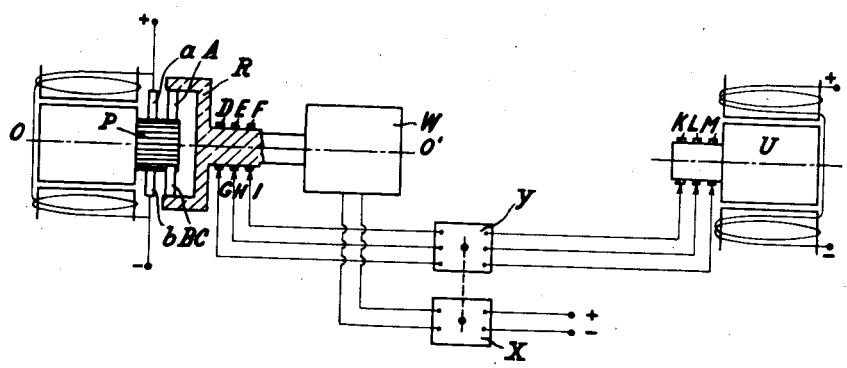
Inventors,
P. Fourmarier, Jr. &
M. Lempereur
By: Glascock Downing Patented May 20, 1941

2,243,004

UNITED STATES PATENT OFFICE 2,243,004

ELECTRIC ARRANGEMENT FOR TRANSMITTING ANGLES

Paul Fourmarier, Jr., and Maurice Lempereur, Brussels, Belgium, assignors to Servo-Frein Dewandre, Société Anonyme, Liege, Belgium Application July 31, 1939, Serial No. 287,632
In France August 12, 1938

1 Claim. (Cl. 172—239)

Our invention relates to an electric angle transmitting arrangement enabling to obtain a synchronous angular motion of two or more rotatably mounted shafts, at speeds the ratio of which is equal to the quotient of any two whole numbers.

The device according to the invention substantially includes a transmitter such as a $2p$-polar D. C. motor the commutator of which has frictionally cooperating therewith,—in addition to the $2p$ rows of feeding brushes,—$pq$ rows of further brushes, the latter rows being shifted through $$\frac{360}{q}$$

electric degrees with respect to each other and secured to a brush-holder crown member adapted to rotate freely about an axis registering with the axis of the said motor. The latter brushes are connected with $q$ slip-rings rigid with the shaft carrying the said crown member, $q$ stationary brushes being arranged to slip on the said slip-rings and being electrically connected with the armature of a receiver comprising a $q$-phase $2p'$-polar synchronous motor.

Preferably, the two shafts synchronous movement of which is sought are coupled, each through a suitable reducing gear, to the shaft of the brush-holder crown and to the receiver armature respectively.

The brush-holder crown may be operated manually or by means of an electric motor.

The arrangement according to the invention may also be used as a position indicating device, such as for the remote checking of the angular motion of a rotary shaft, or as a power transmitting device, such as for causing a determined angular movement of a rotary shaft.

By way of illustration, an embodiment of the invention will be hereinafter described with reference to the accompanying diagrammatical drawing which shows an example of the arrangement according to the invention.

As shown in the drawing the transmitter of the arrangement comprises a $2p$-polar D. C. motor. Slipping on the commutator P of the said motor there are, in addition to the $2p$ normal rows of feeding brushes $a$, $b$, further $pq$ rows A, B, C of brushes, the latter rows being shifted through $$\frac{360}{q}$$

electrical degrees with respect to each other. In the example illustrated the latter brushes are three in number, $p$ being equal 1. The said latter brushes are secured to a brush-holder crown R which may rotate freely about an axis OO' registering with the axis of the said electric motor. The brushes of the rows A, B, C are connected with $q$ slip-rings D, E, F rigid with the shaft of the said crown member and in frictional contact with $q$ stationary brushes G, H, I.

The receiver includes a $q$-phase armature U furnished with $q$ slip-rings K, L, M electrically connected with the brushes G, H, I. This is a $2p'$-polar armature mounted to rotate freely in a field-winding member supplied with direct current.

The arrangement according to the invention operates as follows:

The transmitter-motor being connected to the terminals of a D. C. network, rotates, and consequently, there are, between the brushes A, B and C, $q$ potential differences which represent the instantaneous values of $q$ potential differences in a $q$-phase system. Since the $q$ phases are balanced, the said potential differences give rise, in the receiver armature U, to $q$ currents proportional to the said potential differences. Under the action of such currents the armature takes such a position with respect to the field winding member, that the magnetic field of the armature coincides with that of the field-winding member.

The position of balance of the receiver is thus a function of the position of the brushes. If the transmitter and receiver fields are of identical shape and the torque on the receiver shaft is zero, the receiver armature will, at any instant, be so positioned that the slip-ring connections in the receiver motor will be situated, with respect to the field poles of the said receiver motor in the same manner in which the brushes A, B, C are positioned with respect to the poles in the transmitter motor. Owing to this provision the receiver will move in perfect synchronism with the brush-holder crown.

The arrangement according to the invention may be used both as a low power device for remote indicating or checking work, or as a power transmitting device. In the latter instance it is necessary, in order to secure a satisfactory efficiency, that the resistance of the armature be as small as possible, in order to reduce the corresponding losses due to the Joule effect. Therefore, it would not be permissible to leave the receiver armature in permanent electric connection with the terminals of the transmitter brushes when the speed of rotation is nil or low, In this instance it is necessary to interpose into the leads connecting the brush-holder crown with the receiver-armature a $q$-phase rheostat which will be progressively short-circuited in measure as the velocity of the arrangement increases.

The brush-holder crown may also be driven from a low power electric driving motor W. The rheostat X controlling the speed of the auxiliary motor is in this instance mechanically coupled with the starting rheostat Y connected in series with the receiver armature, in order to provide synchronism in operation.

The arrangement of the invention is capable of a great number of different applications. More particularly, it may be used for the remote transmission of indications applying to the ruling of ships, to the point of pieces of artillery, or for the remote control of the displacements of such devices as a ship's rudder or a piece of artillery or other arms mounted on a support. The arrangement of the invention further enables to check instantaneously from a distance the displacements imparted by any driving means to a rotatably mounted shaft. Generally speaking, the arrangement according to the invention enables to automatically secure a thoroughly synchronous operation, with any predetermined speed ratio, of two rotary shafts having no mechanical connection between them.

What we claim is:

An electric system for transmitting synchronous angular motion of at least two rotatably mounted members at speeds the ratio of which is equal to the quotient of any two whole numbers comprising, a rotary transmitter provided with a commutator, brushes in sliding contact with said commutator for supplying current to the transmitter, a rotary member capable of free rotation about the axis of the transmitter, brushes mounted on said rotary member cooperating frictionally with said commutator and spaced $$\frac{360}{q}$$

electrical degrees with respect to each other, $q$ slip rings on the rotary member electrically connected to the brushes thereof, a rotary receiver comprising a $q$-phase polar synchronous motor, an armature mounted for rotation in the receiver, means for electrically connecting said slip rings with said armature, an electric motor for driving said brush carrier, a rheostat for regulating the speed of said motor, a second rheostat interposed in the electrical connection between the slip rings and the armature, and means for simultaneously controlling the two rheostats to decrease the resistance of the second rheostat when the resistance of the first rheostat is decreased.

PAUL FOURMARIER, Jr.
MAURICE LEMPEREUR.